Aug. 21, 1934.    J. BARRAJA-FRAUENFELDER ET AL    1,971,102
STRATEGICAL DEMOLITION TORPEDO
Original Filed Dec. 30, 1930    9 Sheets-Sheet 1
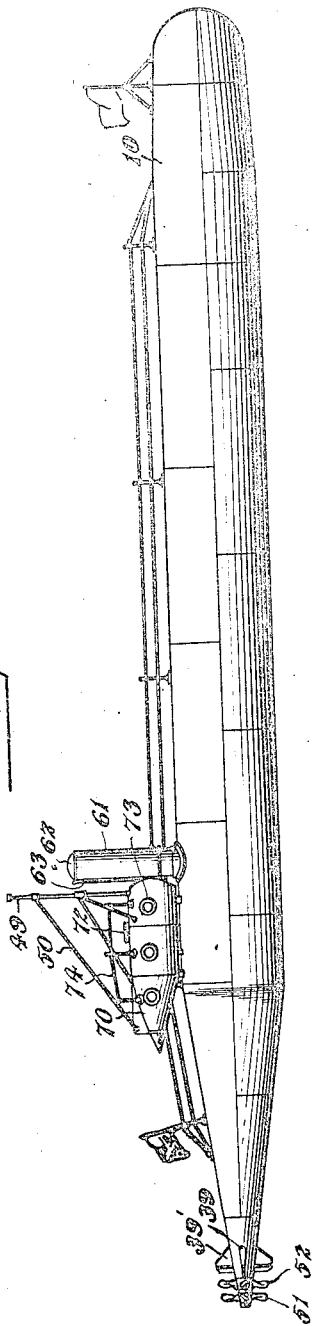
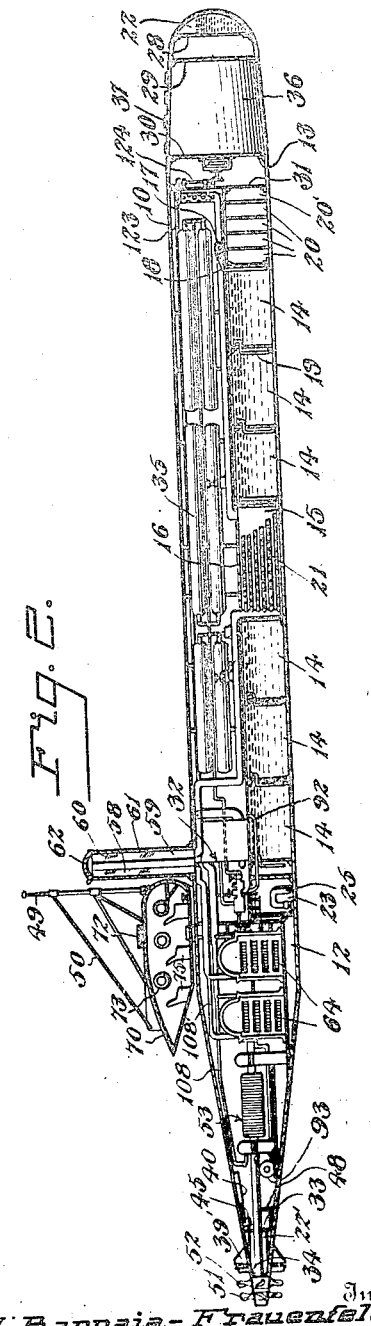
Inventors
J. Barraja-Frauenfelder
W. C. Magee
J. H. Thomas
P. P. Krug
By Lacey & Lacey, Attorneys

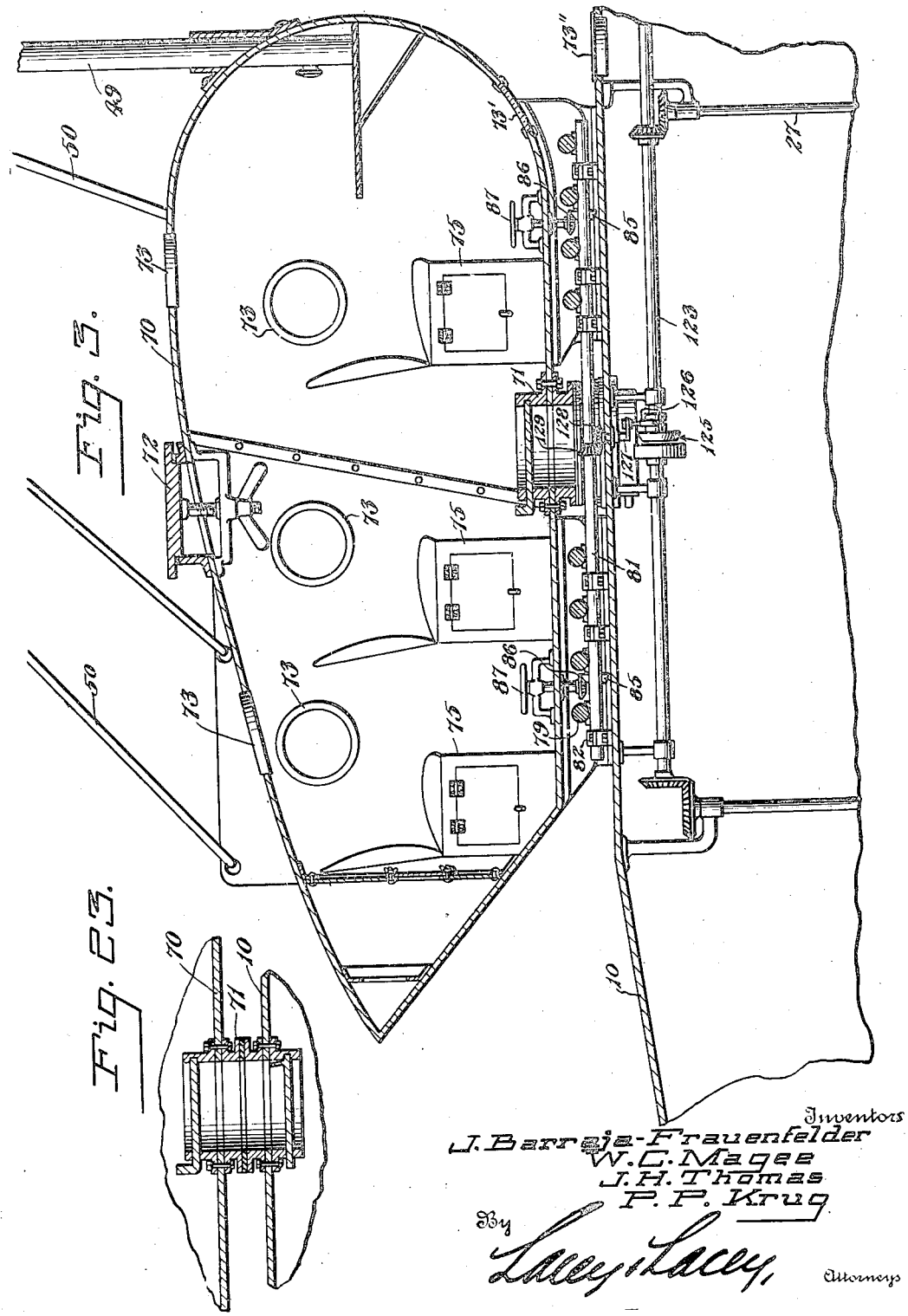

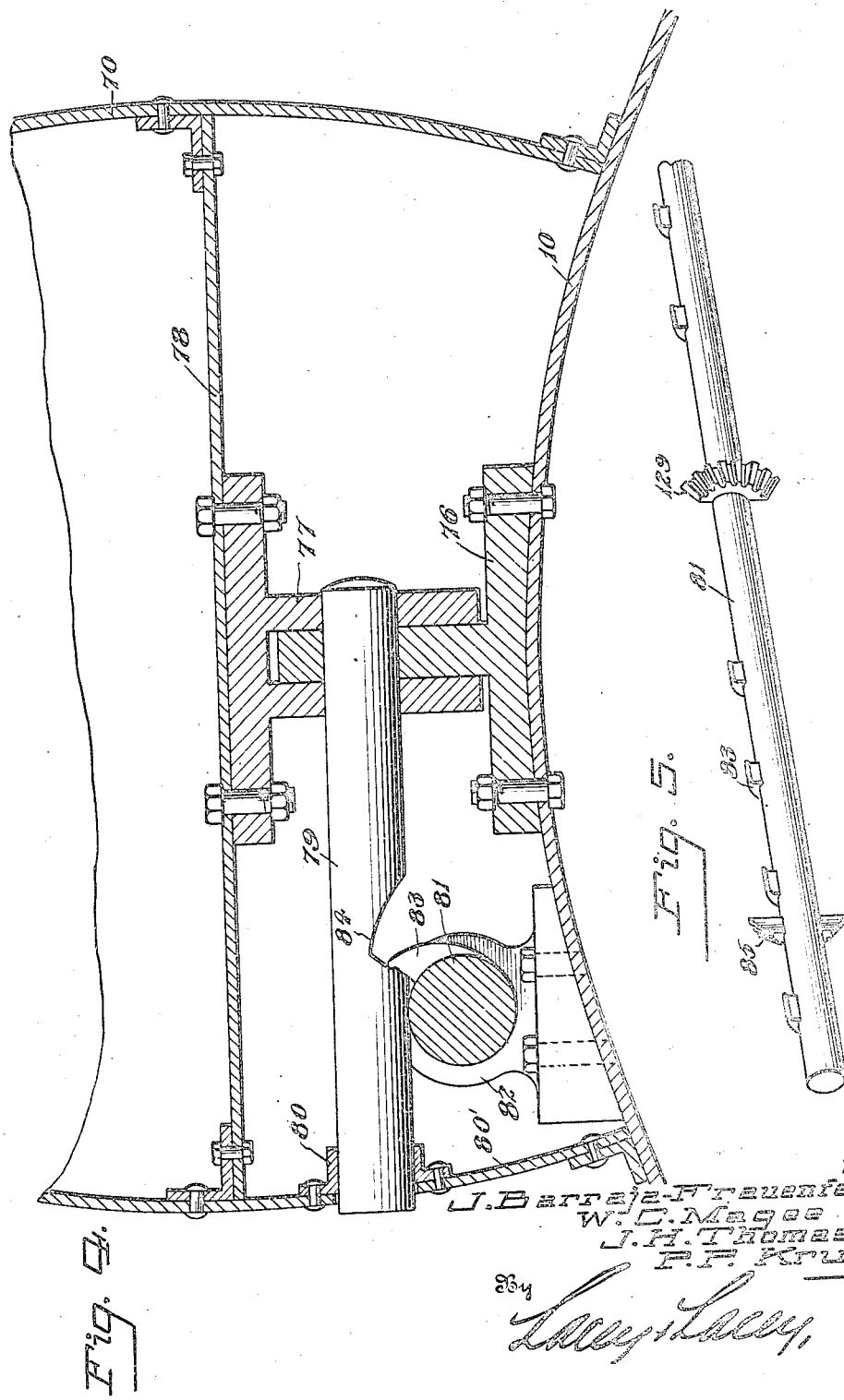

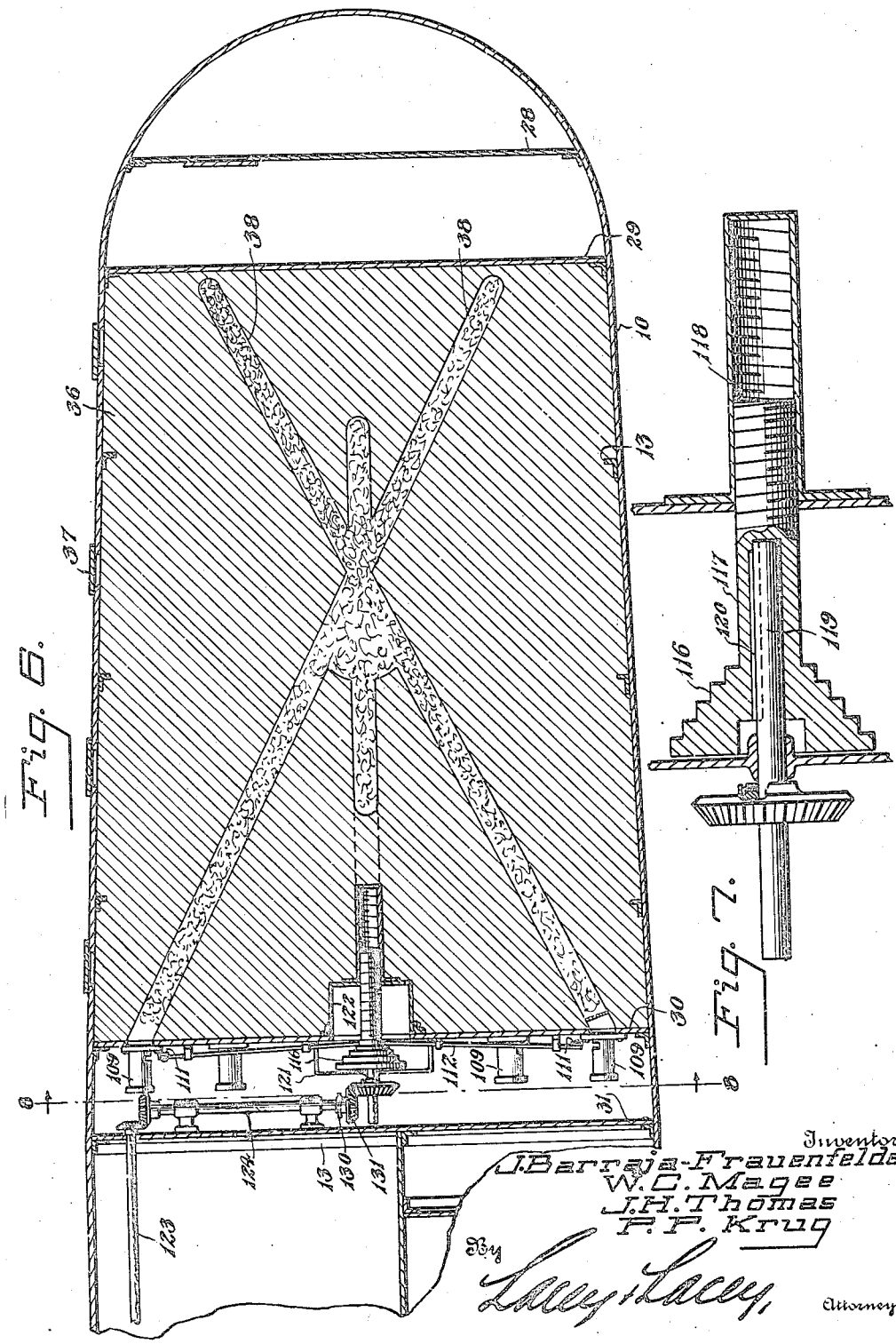

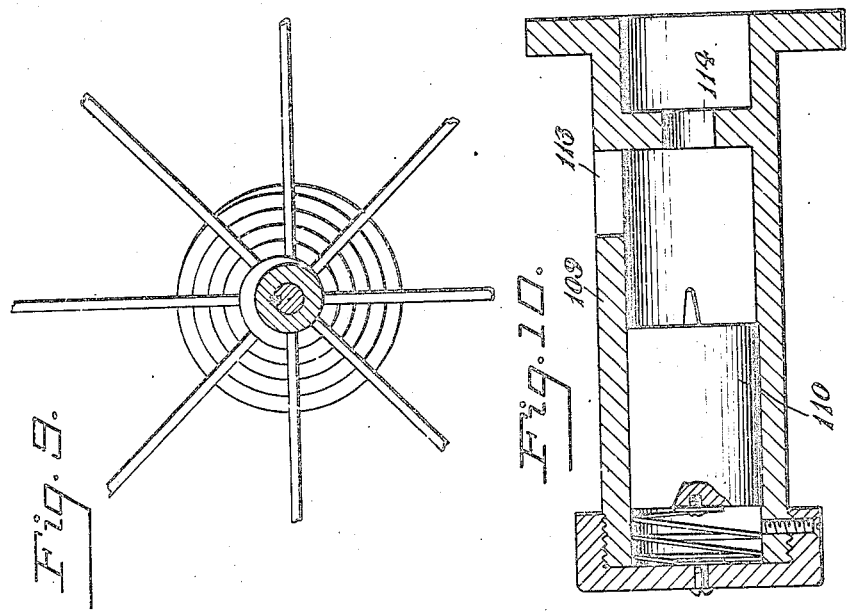
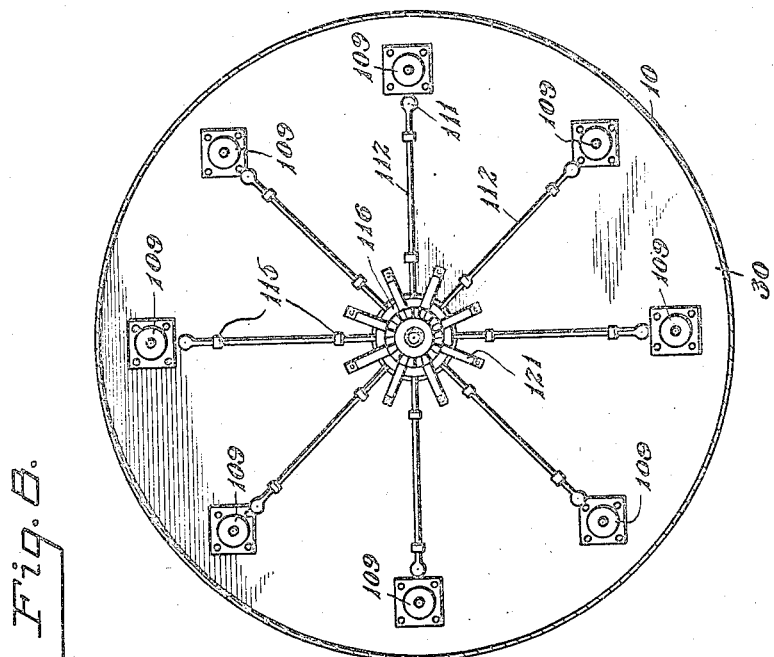

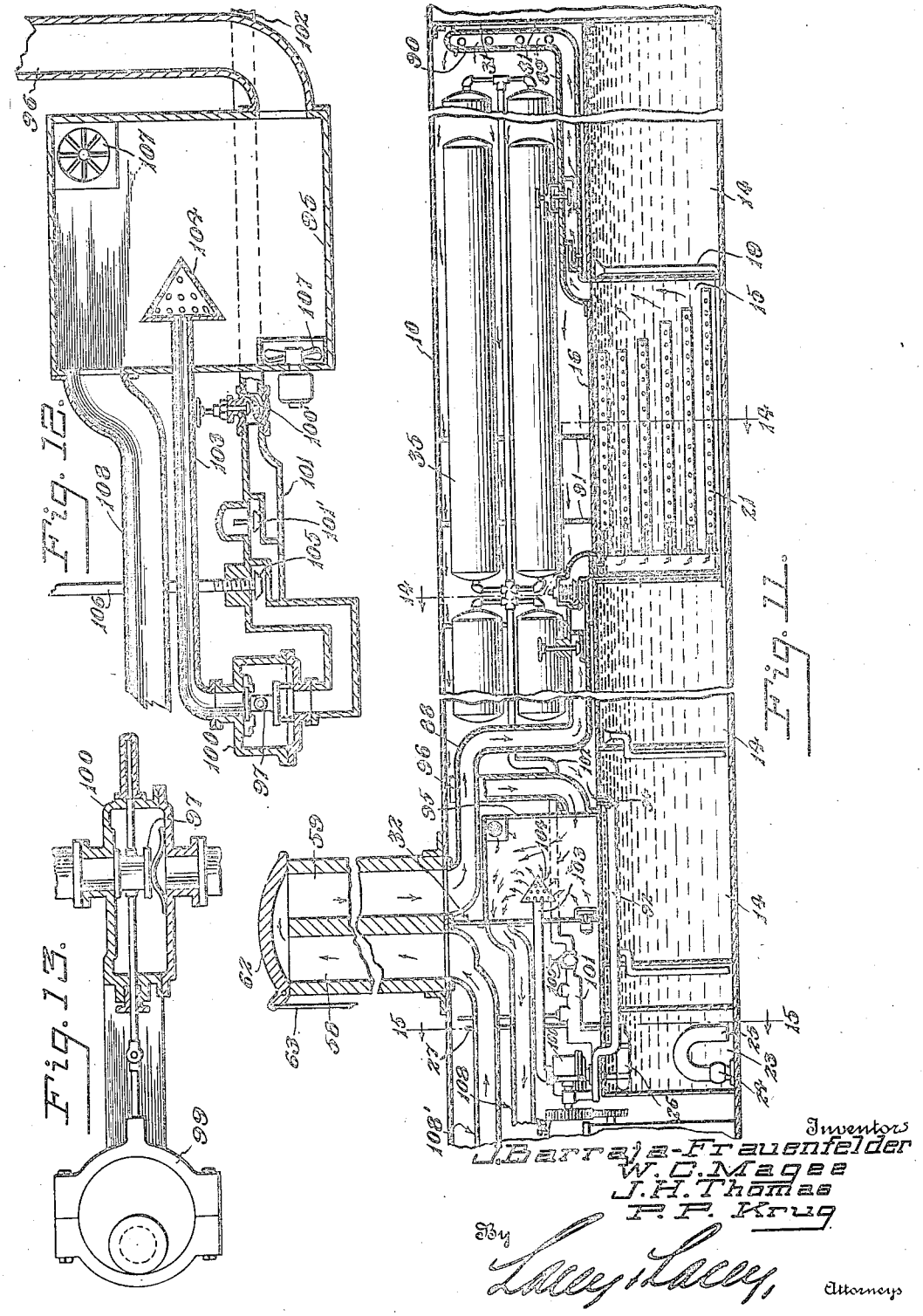

Aug. 21, 1934.  J. BARRAJA-FRAUENFELDER ET AL   1,971,102
STRATEGICAL DEMOLITION TORPEDO
Original Filed Dec. 30, 1930   9 Sheets-Sheet 7
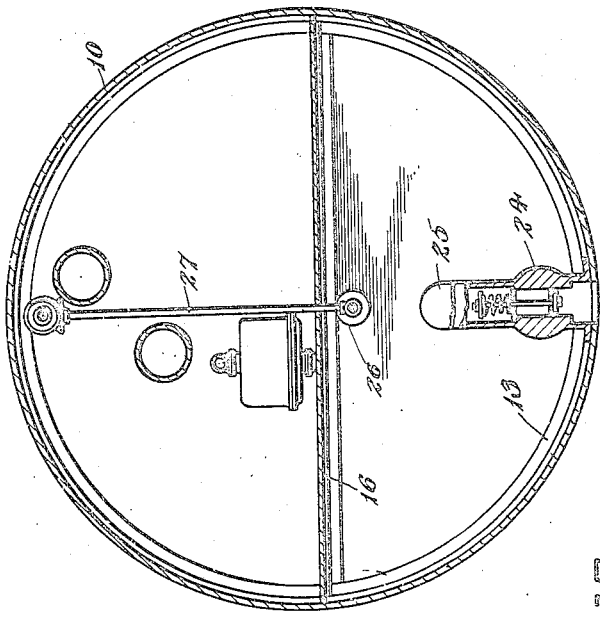
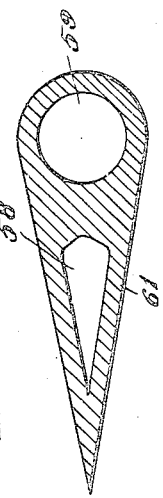
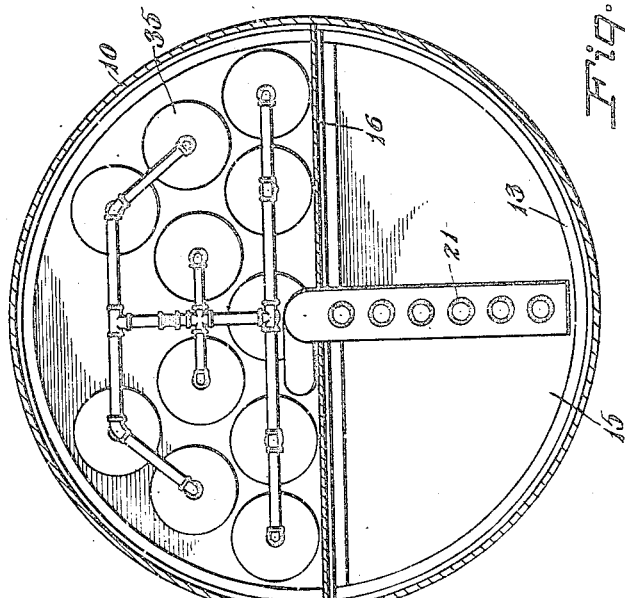

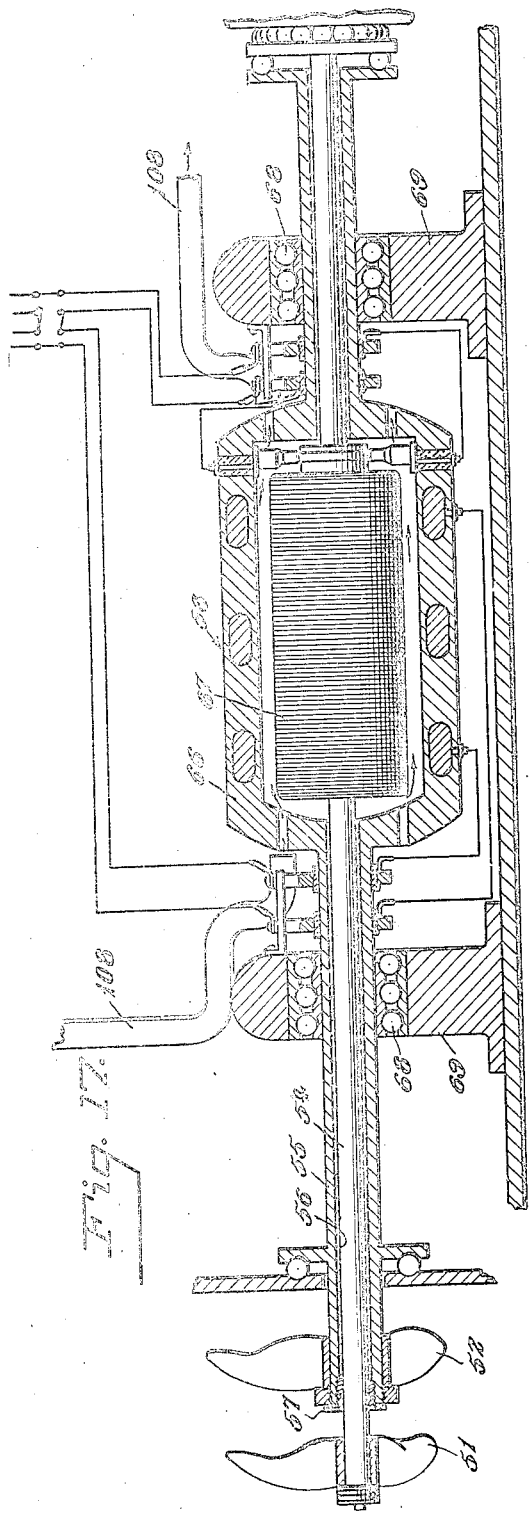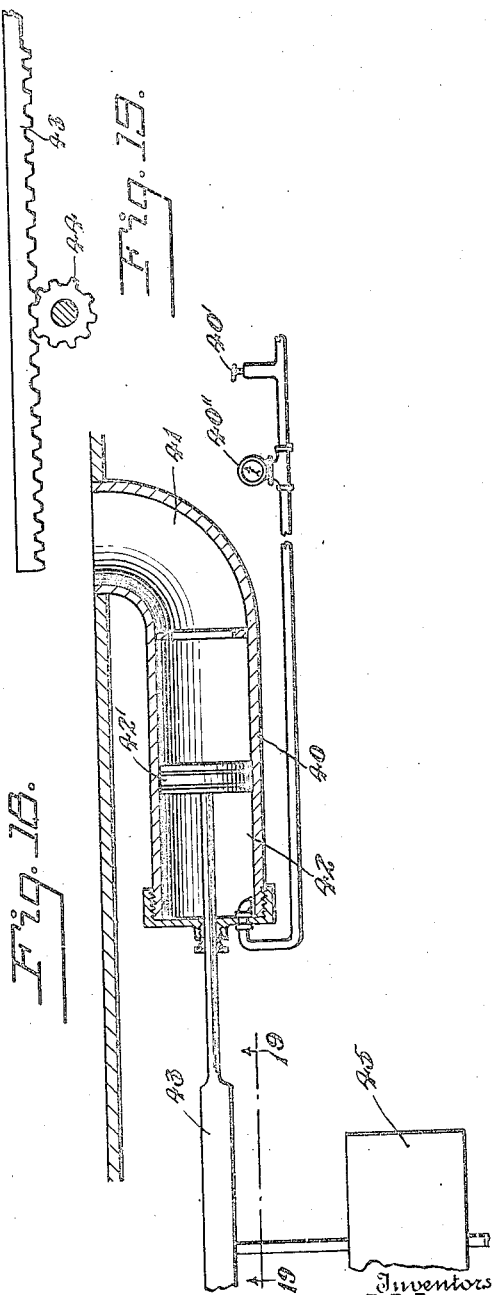

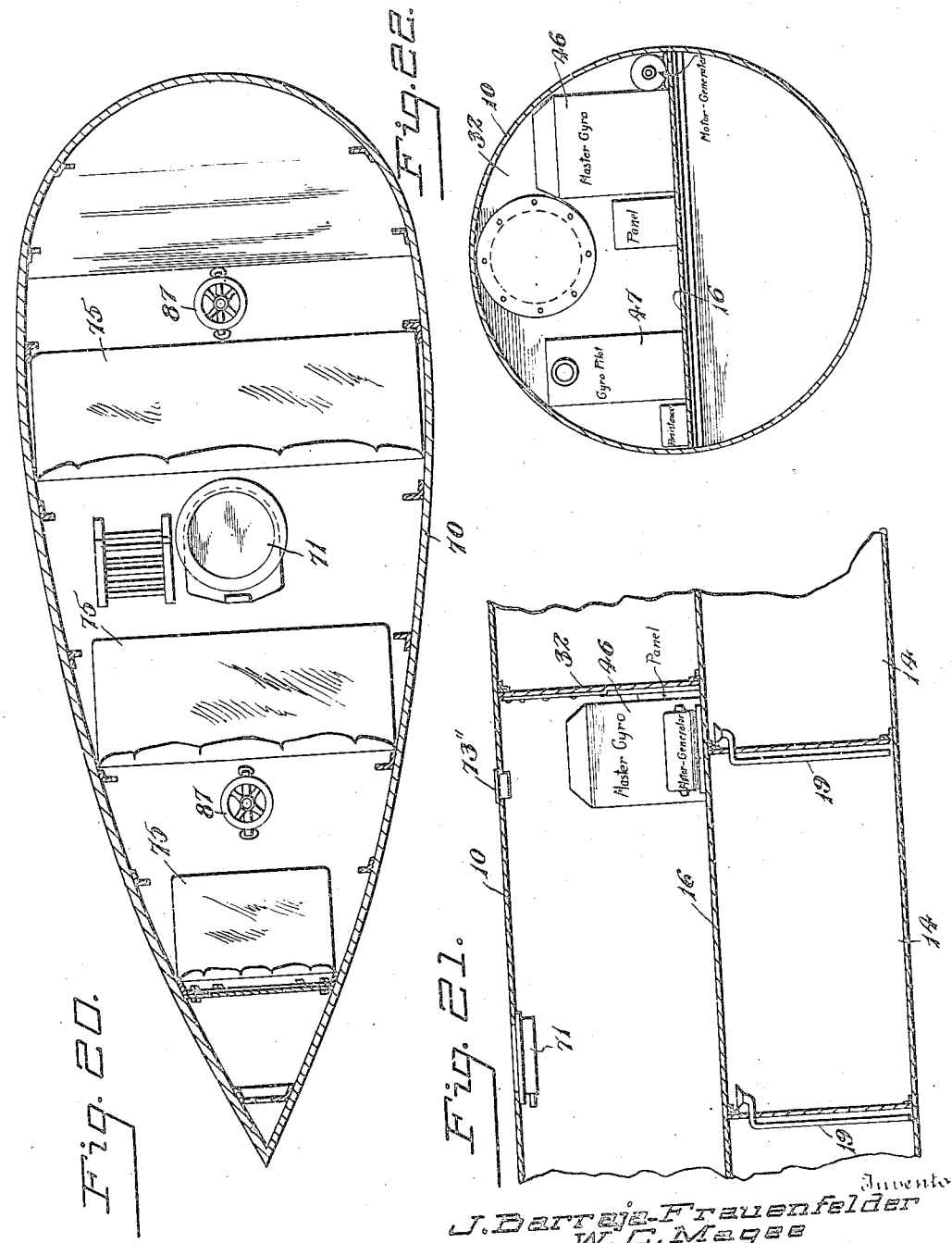

Patented Aug. 21, 1934

1,971,102

UNITED STATES PATENT OFFICE

1,971,102

STRATEGICAL DEMOLITION TORPEDO

Joseph Barraja-Frauenfelder and William C. Magee, Philadelphia, and John H. Thomas, Brookline, Pa., and Philip P. Krug, Harrison, N. J., assignors, by direct and mesne assignments, to The Strategical Demolition Torpedo Company, Inc., Philadelphia, Pa., a corporation of Delaware Application December 30, 1930, Serial No. 505,654
Renewed January 15, 1934

11 Claims. (Cl. 114—16)

This invention relates to weapons of war, and has for an object to provide a naval weapon to be used as an offensive or defensive weapon on either tactical or strategical missions, which has certain characteristics of the torpedo and also of the submarine, and in addition, other characteristics not now employed in any other weapon of war, the weapon being capable of running under water at high speeds now unattainable by ordinary submarine boats, of being guided to its point of contact and destruction by either human hands or mechanical controls or both, being capable of carrying an explosive charge whose destructive powers are sufficient to demolish, annihilate, and completely destroy any vessel it may be sent against, or materially disrupt gun emplacements, forts, canals and coastal cities; and being adapted to allow the operators to escape after an apparent successful collision with an enemy ship is imminent and unavoidable. This invention will hereinafter be referred to as a strategical demolition torpedo.

The weapon is of single hull construction, although it is not desired to be limited to the construction of single hull, as the weapon may be of double hull construction, if convenient and desirable, with circular transverse sections throughout, although such sections need not be circular, thereby obtaining greater strength for submerged work with lighter design than that of an ordinary submarine, whose sectional axes rise toward the bow and stern to insure ample metacentric height on those vessels, but which metacentric height is provided for in this torpedo by placing all fuel, lubricating oil and ballast tanks with their center of gravity far below the horizontal centerline. With double hull construction, the fuel and lubricant oil tanks may be disposed differently, and because of dispensing with the storage battery, the usual U shaped tanks and ballast tanks above the horizontal center of gravity are also done away with.

A tonneau, superimposed upon the after section of the hull, (but it is not desired to limit the position of tonneau to the particular one as shown on accompanying drawings or in further description, as it may be placed either forward or aft of this position or dovetailed or inserted within the torpedo hull), is the control cabin, and is detachable from the hull. The time of detachment, when in action, may be defined as when collision between torpedo and enemy is assured, imminent and unavoidable. The interior is similar to that of a large automobile tonneau and the torpedo is controlled entirely from within it. In submerged work, the tonneau is normally isolated from the torpedo, although this isolation is not necessary as even while in the submerged condition, the operators may, if they desire, have ingress to the torpedo proper. After detachment, the tonneau comes to the surface and floats awash and its crew may be rescued by its own or any other ships, or aircraft, or may sustain life until it is carried ashore or to a vessel at sea by the then prevailing ocean currents. Even though the accompanying drawings do not show a motive power provided for the tonneau, motive power may be installed at any time, and it is not intended that the construction of the tonneau be limited to one that does not have its own motive power for either propulsion or power for radio communication. Further it is not desired that the buoyancy of the tonneau be limited to any specified figure, but facilities may be provided to adjust the tonneau to correspond to the equivalent conditions of submarines known as either "surface", "awash", "periscope depth" or "submerged".

While the main charge of explosive is preferably carried in the foremost part of the torpedo, if necessary it can be placed at any convenient point in the torpedo. It is composed preferably of cast T. N. T., but any explosive of like nature may be used; it is recessed to receive a series of granulated primers, which in turn are detonated by fulminate of mercury detonators, or any detonating material of like nature exploded by firing pins upon impact of the weapon, which pins are automatically armed by the main propeller shaft after the tonneau is released.

The fuel and lubricating oil tanks extend along the lower part of the hull, as does the control tank, which latter is a ballast tank with dual purpose, being designed primarily to trim the weapon to the submerged condition, and also being used for purification of and cooling of the engine exhaust gases while in the submerged condition.

The decking above the fuel tanks and control tanks is the support for high pressure flasks, to be filled with any substance such as oxygen, air, or "blau" gas, used in connection with submerged propulsion, although for this description it may be assumed that they will be charged with oxygen. The tonneau balance tank is used to compensate for the torpedo becoming heavy upon release of the tonneau, and may either contain water or lead ballast.

Propulsion is preferably effected by electrical generators driven by internal combustion engines, but it is not desired to be limited to the use of electric drive, as any preferred motive power may be used. The drawings accompanying this description illustrate an electric drive as an example of a practical method of propulsion.

The main motor is of novel construction, the field thereof being in bearings, with both the armature and the field free to rotate in opposite directions and each being fitted with a propeller shaft.

The propeller pitch is selected to enable the torpedo to make the maximum speed possible for the shaft horsepower installed, and the area of both propellers will be proportioned to balance the ratio of frictional losses between the rotating field and the armature, and if found desirable, a rheostat control for current flow in field or armature, actuated by an idle gearing drive by both shafts may be employed.

The tail structure will consist of vanes fitted to the hull at 90 degrees from each other or at any other suitable angle, and is provided with vertical and horizontal planes of proper area to give nicety to control at high speed. Connection between the planes and the steering engines will be similar to that employed on submarines.

Hydrostatic control is employed to adequately handle the horizontal planes in the necessary manner to maintain depth automatically.

A gyroscope compass, together with a gyropilot, in common use on many ocean going vessels, will be used in vertical steering.

A fairwater encloses the engine intake and exhaust tubes and extends considerably above the hull. Silencers are fitted within the tubes and the fairwater may be opened to the atmosphere for surface cruising. A portable bridge is fitted in rear of the fairwater on top of the tonneau for mild weather use.

The generating engines are cooled by circulation of sea-water and the main motor and the generators are cooled also by the passing of engine induction air through these units before being used by the engine.

The engine intake air, in surface cruising, is taken direct from the atmosphere, while in submerged cruising, it is taken from a control tank. Surface cruising exhaust passes through the after exhaust tube in the fairwater, via silencers, to the atmosphere. In submerged cruising, it returns through the air intake tube in the fairwater, through the control tank and out into the high pressure storage room, where it is processed for continued use submerged.

The personnel required are preferably one commanding officer, one assistant, and three or four engineers. The tonneau is of sufficient size to berth the crew. Fresh water is carried in trimming tanks and is used in the sanitary system in cruising. Fresh water and provisions are also carried in the tonneau.

Generally, the weapon is designed of sufficient tonnage to carry the explosive charge required, the machinery weight, and all necessary equipment and storage for submerged work, and to make the craft a sea-going vessel in every respect. On the other hand, it is constructed with the view of low cost, rapid construction, and the proper ratio of horsepower to tonnage, wetted-surface, and length, to enable it to be driven at greater speeds than any other potential enemy vessel will have, and that it may be desired to overtake, and at the same time use this superior speed as means of the weapon's own defense.

Generally, also, the weapon will preferably conform to the following dimensions: Length, more than 30 feet; it is found however that about 130 feet is an excellent size; beam, at a ratio of about 1 to 12 of the length; depth, same as length; displacement submerged, corresponding to length and beam; buoyancy submerged full war condition, either positive or negative buoyancy that can be overcome by use of horizontal planes in connection with speed; all fuel and oil removed, corresponding to displacement and materials used. Surface speed, awash speed and submerged speed, maximum possible for the installed horsepower; the radius of action at maximum speed should be over 5,000 miles to be a strategical weapon and the hull resistance should be equivalent to over 100 feet depth.

To illustrate clearly the method of building and operating, and the materials that may be used in the construction of strategical demolition torpedoes, the following is a more detailed description of the structure and detail, it being understood that modifications may be resorted to in the design and construction of torpedoes of greater or smaller, and similarly geometrical sizes, with power plants, tonneaus and other mixtures to conform to the greater or smaller dimensions, without departing from the spirit or sacrificing any of the advantages of the invention.

In the accompanying drawings illustrating the preferred embodiment of the invention, Figure 1 is a side elevation of the strategical demolition torpedo, Fig. 2 is a longitudinal sectional view showing the general arrangement of the parts, Fig. 3 is a detail longitudinal section of the tonneau and the connecting mechanism between the tonneau and hull of the torpedo, Fig. 4 is an enlarged cross sectional view through the tonneau keel showing one of the lock bolts and the trip shaft, Fig. 5 is a detail perspective view of the trip shaft, Fig. 6 is a longitudinal sectional view through the war nose and exploder arming mechanism, Fig. 7 is a detail longitudinal sectional view showing the arming spiral and drive thereof, Fig. 8 is a cross sectional view taken on the line 8—8 of Fig. 6, Fig. 9 is a detail elevation showing the detonator holding rods and actuating spiral therefor, Fig. 10 is a detail sectional view through the exploder, Fig. 11 is a longitudinal sectional view through the torpedo showing the exhaust purifying system for submerged propulsion, Fig. 12 is a detail sectional view showing the oxygen metering valve and mixing room or chamber, Fig. 13 is a detail sectional view of the oxygen metering valve and drive, Fig. 14 is a cross sectional view on the line 14—14 of Fig. 11 showing the oxygen flasks and control tank therebelow, Fig. 15 is a cross sectional view taken on the line 15—15 of Fig. 11 showing the compensating tank, Fig. 16 is a cross sectional view through the fairwater stack, Fig. 17 is a longitudinal sectional view through the main motor, Fig. 18 is a longitudinal view through the hydrostatic piston which controls the steering engine, Fig. 19 is a sectional view taken on the line 19—19 of Fig. 18, Fig. 20 is a cross sectional view of the tonneau, Fig. 21 is a fragmentary longitudinal sectional view of the instrument room in the hull, and Fig. 22 is a cross sectional view taken through the instrument room.

Fig. 23 is a detail cross sectional view of the double gate valve connecting the tonneau and torpedo.

Shell

The shell 10 is composed of strakes of soft steel or any other suitable material. The strakes may be either butted or lapped fore and aft and horizontally, and will be normally riveted water-tight, and in addition can be welded for greater water-tightness and strength.

Each strake overlaps the adjacent strake and they are so arranged that the machinery space can be built in one unit. The machinery foundations 12 are installed in such a way that further machinery installation can be done by entrance into the entire diameter, thereby giving ease of accessibility to the space available.

The strakes may be rolled, crimped and punched in the same handling of the material. Further, the complete assembled hull can be transported by railroad from points of construction inland or can be assembled in three or more sections for shipment.

Frames

The hull construction does not vary greatly from the present method of submarine hull construction, materials for the frames 13 being soft steel, or any other suitable material cast, rolled, or wrought. The frames are preferably circular throughout, the intermediate frames being of the same diameter, and the bow frames becoming slightly smaller as they are placed forward for the purpose of producing a certain waveline which has been found to give less resistance than present submarine construction.

The frames at the stern continue gradually diminishing the diameter of the craft to produce a conical contour which has been found to reduce suction in wake of the torpedo.

As a result of this construction, it will be found that for a speed of over 30 knots, the wetted surface ratio to horsepower, displacement ratio to horsepower, length to horsepower, and cross section to horsepower, all closely approximate each other.

Fuel tanks

The fuel tanks 14 are located along the lower part of the hull with their centers of gravity below the horizontal center line or axis of the hull, as shown, as is also the control tank 15, although it is not desired to be limited in placing fuel tanks and control tanks in this particular relation to each other. The hull strakes constitute the outer skin of all these tanks and the decking 16, or oxygen flask stowage support, constitutes the tank tops.

All tanks are fitted with a compensating system in which the fuel oil is displaced by sea water, as usually done in submarines. The tanks are constructed to withstand a pressure internally of at least fifteen pounds per square inch. Pressure is obtained from the discharge side of the main circulating water pump 17, or from a compensating pump operated by the engine shaft. This system eliminates the loss fuel suction, as the engine gravity tank is ordinarily kept full.

The water pressure from the pump line 18 enters the bottom of the first fuel tank, forcing the fuel upwardly, followed by compensating sea water, the compensating sea water from the first tank, when emptied of fuel oil, entering the next succeeding tank through a pipe 19, as illustrated.

Lubricating oil tanks

Lubricating oil is carried in four tanks 20, located forward of the fuel tanks, as shown, with a total capacity of about one-eighth of the fuel capacity, and of similar construction as the fuel tanks. The tank 20', located forward of the lubricating oil tanks, is used for the lubricating oil compensating system, it being carried empty at full war load and filled to about seven-eighths full with sea water upon the use of the first lubricating tank, which latter is then used for compensation in a similar manner while the next succeeding tank is being used.

Compensation will be sufficient to keep torpedo to conform with required buoyancy and trim. Suitable lubricating oil will be used, and as the weight per gallon of any lubricant that would be used will be about 7.75 pounds and sea water averaging 8.55 pounds per gallon, it will be seen that only intermittent compensation will be necessary. Lubricating oil consumption is estimated at one tenth that of fuel consumption which ratio obtains on most all internal combustion engines.

Control tank

The control tank 15, centrally located with respect to the fuel tanks, is constructed in the same manner as the fuel tanks, except as to strength. It is not necessarily a high pressure tank, but is flooded when in the submerged condition. Its capacity is the approximate amount of positive buoyancy the torpedo carries when in the surface condition. Suitable sea-valves (not shown) are fitted for flooding from sea direct or through a control within the torpedo, and in addition to the primary function of ballasting, the exhaust of the engines passes into the tank through perforated pipes 21 and from thence through the sea water, where it is partly purified, as will be presently described, and into the storage space above. The tank, however, is strengthened to enable blowing at the maximum submerged depth in the same manner as the safety tank installed in certain type submarines.

The capacity of the control tank is commensurate with displacement of the weapon, and the center of gravity of the torpedo is slightly aft of the tank center.

Trimming tanks

A trimming tank 22 is fitted near the extreme bow for forward trim, and another in the stern, as shown at 22', is used for trimming due to fuel consumption. These tanks are normally flooded in full war condition, with fresh water, and are coated, cemented, or metal sprayed to permit their use for drinking purposes.

The capacity of both tanks is equivalent to the difference in weight between the total fuel capacity and the total weight of sea water the fuel tanks will hold.

Assuming the difference in fuel and the sea water to be used to displace fuel to be in the ratio of 8.55 pounds per gallon for sea water and 7.48 pounds per gallon for fuel, the ballast carried in these tanks will be diminished as the use of fuel progresses. Both tanks are fitted with suction and blow lines (not shown), as in trimming tanks of submarines, the fresh water passing overboard through the torpedo sanitary system.

Tonneau balancing tank

The tonneau balancing tank 23 is for the purpose of compensating for the reserve buoyancy of the tonneau, and is constructed similar to the fuel tank system. A large sea check valve 24 is provided in a sea pipe 25 which opens at the bottom of the tank. An air bottle 26 permits blowing of the tank, the valve of which is opened by a stand rod 27 rotated by the arming shaft upon release of the tonneau. The tank is carried full of fresh water, salt water, or movable lead, and upon release of the tonneau, which has a reserve buoyancy equal to the tank capacity, the tank is automatically blown.

This tank is designed for a capacity which will be finally adjusted only after successive trials of releasing tonneau at all speeds and finally determining in a practical way what positive buoyancy is the most correct for the particular type and size tonneau.

Ordinarily, the individual air flask for blowing will be fitted with the usual swirl reducer to eliminate following bubbles. The tank will be strengthened to sustain a pressure as great as that which the outer hull is tested for.

Bulkheads

In addition to the fuel tank bulkheads, there is one forward trim tank bulkhead 28, fitted with drain and blow (not shown) and provided with an access port.

A bulkhead 29 is fitted to measure the charge of explosives desired for any particular mission, but the main charge may be cast between extreme bulkheads, thereby eliminating the movable bulkhead, if full charge is wanted.

A bulkhead 30 is fitted for detonator firing mechanism comprising preferably eight detonator firing pins of rugged construction, as hereinafter described.

A bulkhead 31, forward of the first fuel tank and the oxygen flask stowage compartment, is fitted with an access plate 31' to permit passage from the after part of the torpedo to the detonator room between the bulkheads 30 and 31. The arming shaft for the detonator mechanism passes through the bulkhead 31.

A bulkhead 32 is semi-circular and watertight, and isolates the oxygen flask stowage room from the machinery space. The engine intake pipe passes through this bulkhead, as does the arming shaft and blow lines, and it also serves as a support for the gyro-compass and gyropilot accessories.

The after trim tank bulkhead 33 permits both propeller shafts and rudder control shafts passing through, in addition to the necessary blow and drain lines. The after bulkhead 34 of this tank will be just forward of the first propeller, and will contain the main shaft tail bearing.

Oxygen flask stowage

In the space between the two bulkheads 31 and 32 forward of No. 1 fuel tank and forward of machinery space, there are installed a number of rows of high pressure flasks 35 of such diameter and length that will have the greatest cubical contents for the installation space available. They are constructed to withstand a working pressure of 6,000 pounds per square inch or more. The flasks are preferably constructed of seamless drawn steel.

Charged with oxygen to the maximum working pressure, these flasks will produce the necessary air for the maximum radius of action.

The main detonating charge

The main charge 36 is cast into the space between the mobile bulkhead 29 and the detonator bulkhead 30. The object of the mobility of the bulkhead 29 is to accommodate the measured charge required for any particular mission. Trinitro-toluol is cast, or other explosive is placed, into this space by means of access holes 37 at the topmost point of the charge space. The charge is preferably drilled, as shown, for reception of the detonating primers 38, composed of granulated or crystallized T. N. T., or other type primer, and the detonator bulkhead is so placed as to allow the firing pins and fulminate of mercury detonators to align with the primers.

Lead ballast may be used with any reduced charge to sustain proper lever-arm, stability and buoyancy.

The installation of the charge, primer and exploding mechanism is permanent with the exception of the fulminate of mercury detonators.

Tail structure

The tail structure is similar to any present day torpedo or submarine fitted with horizontal and vertical vanes 39 and 39' at right angles to each other and equipped with gudgeons and pintles for rudder support. Bracing straps for strengthening and propeller protection are fitted between these vanes, the vanes extending slightly outboard of the propeller tips.

Rudder and horizontal plane operation is similar to submarine equipment and areas are made to conform to the requirements of handling the torpedo at high speeds.

Horizontal control

Depth control, if automatic, must be the function of a hydrostatic piston arrangement, 40, many designs of which are available for control of submarines. However, in the present invention, the use of a piston, which counter-balances sea pressure on one side, as shown at 41, with air 42 on the opposite side, is employed in lieu of depth setting by spring compression. The torpedo is brought to the desired depth by gradual increase in air pressure behind the piston. As shown in Fig. 19, this gradual increase or the sustenance of a desired pressure, is brought about by setting the air reducer 40' to the required depth in pounds pressure per square inch by mechanical control from the tonneau through detachably secured operating rods fitted with socket or bayonet joints. The depth gauge 40'' is seen through quartz ports in left side of tonneau decking, and may be graduated in feet or meters designating the depth it is desired that the torpedo sustain. Air leakage past piston rings, 42' is made up by continuous functioning of reducer 40' and water that may accumulate on air side of piston 42 may be dispensed with through the air line 41' and valved off along the air setting line on the hydrostatic piston side of the depth setting reducer. As shown in Fig. 19, the piston is operatively connected by a rack and pinion 43 and 44 to the horizontal steering engine 45.

Said engine, which transmits movement due to varying depth of the hydro-piston, is preferably of the usual oil type used for the purpose, equipped with a follow-up system for neatness of control, the arrangement creating the positive operation desired and required in handling the large tonnage submerged at the desired speed.

Vertical control

A gyro compass 46, a gyro pilot 47, and a steering engine 48 form the equipment, which will obtain automatic control of the weapon.

A simple means of setting courses through socket-ended rods from tonneau to hand setting wheel will be employed. The usual course recorder and repeaters will be placed below quartz ports in top of torpedo hull and will be observed through similar ports on left side of tonneau decking, thereby eliminating any electrical connections or non-detachable mechanical shafts passing from torpedo to tonneau.

Periscope

A periscope 49 is installed in the tonneau and preferably is fitted permanently at the forward end of the tonneau.

This instrument will be braced against the tonneau by rigid steel straps 50 sufficient to withstand water resistance at maximum speeds.

Propellers

The propellers 51 and 52 are preferably designed with pitch sufficient to drive the torpedo at the maximum speed obtainable from the installed shaft horsepower, which may be at the rate of fifty knots more or less, and a diameter of a proper dimension to utilize the total maximum horsepower output of the main propulsion machinery.

The areas of the propellers will be adjusted to balance the specially designed main propulsion motor 53 which carries the after propeller on the armature shaft 54 and the forward propeller on the rotating field shaft 55. The space between the shafts is sleeved with composition material 56 and fitted for packing 57 for water tightness.

Air intake and exhaust

Fitted forward of tonneau are two pressure tubes 58 and 59, preferably enclosing suitable silencers 60. The after tube 58 is used for engine atmospheric exhaust on the surface and awash conditions, and for inboard exhaust in the submerged condition. These tubes extend considerably above the hull and above the tonneau and are encased in a fairwater 61. The after tube and fairwater are stream-lined for high speed, as shown in Fig. 16.

The forward tube 59 is used as the main engine air intake on the surface and awash conditions, and is used as a return inboard exhaust for use in submerged status, a hinged valve 62, operated from the tonneau by a control rod 63, being disposed to connect the tops of both tubes prior to submerging.

The valve 62, which cross connects the tubes at the upper end, is made to withstand sea pressure, and close with sea pressure.

The tubes 58 and 59 are fastened securely enough to the torpedo hull to cause detonation of the main charge should the torpedo proper pass under a vessel and the tubes make contact with ship, which in reality increases the target depth or size.

Main engines

The main propulsive power is preferably supplied by an internal combustion engine and generator unit such as the Diesel type or other type capable of electric drive, of proper capacity, and required installation dimensions, and preferably in two sets 64.

Each set delivers the necessary and available electrical horsepower at the generator terminals, at a convenient voltage. Although direct current is preferred, an alternating current system may be installed.

As the main propulsion machinery required to drive this torpedo does not necessitate particularly an electric drive, we do not want to be restricted to the use of electric drive in further development, but to be enabled to use the direct drive without restrictions.

Motor electrical propulsion

Due to the inner and outer propelling shaft arrangement of the torpedo, a novel type electric motor 53 is employed, using a rotating field 66 and a rotating armature 67, with the forward and after propellers keyed to the shafts respectively. The field and the armature may be designed for any voltage tension of output at any desired speed for each propeller and with the requisite flexibility of control.

As shown in Fig. 17, the hollow shaft of the field turns on bearings 68 carried by suitable pedestals 69. The armature and the field rotate in opposite directions, driving the propellers correspondingly.

Balancing of the revolutions will be through the medium of permanently adjusted propeller areas to equalize any additional friction on the field bearings or through differences in current of field and armature. These differences in voltage or amperage are obtained by utilizing the differences in speed of the two revolving shafts and transmitting such movements to the field or armature resistance rheostats through the medium of an idle gearing driven by each main shaft, (not shown).

Tonneau

The tonneau 70, Figure 3, is in reality the submarine. It is detachable from the hull and fitted with heavy keel and rugged detaching mechanism. The torpedo can be wholly operated and controlled entirely through mechanical connections within the tonneau. Gyro repeater, course recorder, gauges and other instruments are all visible through ports, being housed within the torpedo hull.

Ingress to the tonneau is through a double suitable gate valve 71 on the bottom of the tonneau and an upper hatch 72 on top of the tonneau.

The tonneau is lighted by its own battery, and built for the control of the torpedo and comfort of the operating force, consisting of more or less than six persons, although two only would be necessary on a tactical mission and five or six on a strategical mission, using three or four engineers and two or three operators.

The tonneau is isolated from the torpedo when submerged, although this is not entirely necessary, and the attack is made from this operating station.

Ports 73 are installed along the sides and top; thus celestial navigation can be done from within when the sea and weather do not permit opening of the upper hatch. Instrument reading ports 73' are fitted in the decking of the tonneau, left side, and opposite the tonneau releasing shafts, which align with the ports 73" in the torpedo proper and under which necessary instruments are placed.

For long cruising to station, a portable bridge 74 is erected on top of the tonneau.

Ventilation is provided for and the seats or lounges 75 are convertible into bunks for sleeping purposes. Additional provisions are carried within the torpedo. Charts, navigational equipment and fire control gear, as well as radio equipment, will be located in the tonneau.

The preferred construction of keel and detaching mechanism includes, see Figs. 3, 4 and 5, a keel 76 bolted to the torpedo hull and a channeled keel 77 bolted to the tonneau deck 78. Preferably eight tonneau lock bolts 79 extend through registering openings in the interfitting keels and hold the tonneau locked positively to the torpedo. The outer ends of the bolts are suitably fitted in guides 80 on the skirt 80' of the tonneau to permit the bolts being slid transversely and withdrawn to disconnect the keels.

A trip shaft 81 is mounted in suitable bearings 82 bolted to the torpedo hull and is provided with radial toes 83 which engage in notches 84 in the corresponding tonneau lock bolts. The trip shaft is provided with gear teeth 85 which mesh with gear pinions 86 operated by hand wheels 87 from within the tonneau to rotate the shaft so that the toes will dislodge the lock bolts and release the tonneau.

All control connections entering the tonneau from the torpedo, it will be understood, are detachable by means of bayonet joints or similar connections prior to release of the tonneau, after the controls have been given final adjustment. However, it is not desired to be limited to the use of this particularly described tonneau releasing mechanism.

Air compressors

A suitable air compressor, not shown, will be installed as well as a bilge pump, both fitted to enable operation with remote control.

Generator and motor cooling will be accomplished by the air in engine air intake pipe 108 passing through the generator and motor, as shown by the arrow-heads in Figure 17, before entering induction valves of the engine.

Submerged propulsion

The use of internal combustion engines for submerged propulsion usually necessitates the passing of the exhaust through chemicals for purification and re-use, and the replenishment elements necessary to support combustion. The problems to be solved are dissipation of heat, elimination of $CO_2$, and the renewal of "O". As this weapon is in no sense a submarine, in which it is necessary to support life in addition to combustion, the command of these factors is not necesssarily of such vital importance.

First, life and combustion may be supported on the normal supply of oxygen, 20 percent, and this element may be diminished to possibly 16 percent and still sustain life, but to continue combustion, this percentage can be dropped still lower.

A very small trace of $CO_2$, being fatal to human beings, is not so within the internal combustion engine. Further, no chemical or structural changes occur in nitrogen, the conveyer of the combustive element, due to passing through combustion.

The natural element at sea, salt water, having an affinity for $CO_2$, may properly be used to a great advantage in segregating the heavier gas, $CO_2$, from the supporting gas, nitrogen. Insomuch as $CO_2$ liquefies at a temperature of about 5° below zero F., when compressed to about 500 pounds per square inch, it is seen that as the temperature of $CO_2$ is reduced, it partakes more of a vapor form.

With the above in mind, the exhaust of the main engines is passed through the exhaust pipe 108', see Fig. 11, thence through the cooling tube 58, which is fitted with a silencer, and returns into the torpedo through a tube 59, which also is fitted with a silencer, and then passes through the pipe 88 and enters the control tank 15 through the perforated pipes 21.

Within the control tank, the exhaust is sprayed from the pipes into the water filled tank, mixing with the contents, sea water, and a percentage of the $CO_2$ is removed in passage through the sea water. Some CO is also left in the passage.

At the top of the control tank, a pipe 89, of suitable diameter, allows the remaining gases, composed mostly of nitrogen, to pass to a point aft of bulkhead 31 and be released through a perforated stand pipe 90, into the space between that bulkhead, bulkhead 32, the high pressure stowage room decking 16, and the upper hull. These gases pass aft, being baffled by baffle plates 91 fitted athwartships in the compartment, which compartment contains the high pressure oxygen flasks 35, charged with oxygen to be used for replenishing the nitrogen present, the nitrogen carrying the oxygen to the main engine intake for further combustion.

As the exhaust gases pass aft and become cool, due to the baffling and passing over the oxygen tanks, and are smoothed out, a suction is created through a pipe 92 by an air compressor 93, see Fig. 2. The compressor draws the gases from the lower aftermost part of the stowage room at the point designated by the numeral 94, at which point a large proportion of $CO_2$ will accumulate in a vaporized or nearly liquid form, the composition of the gas at this point being possibly 98.5% nitrogen, 1% of $CO_2$, and .5% of CO and "O". This combination is discharged into a high pressure storage tank, not shown, by the air compressor, or may be discharged without detriment direct into the oxygen tanks when empty, if desired.

The gases remaining at the top of the compartment are sucked into a mixing tank 95 through a pipe 96 which opens near the top of the hull.

A metering valve 97 of the sliding type is operated by the main engines through gears 98 and a pitman 99 to admit oxygen from the flasks 35 into the mixing tank. The intake port of the metering valve housing 100 is connected to the oxygen tanks through a manifold 101 and pipe 102, and the outlet port is connected by a pipe 103 to the mixing tank, and terminates in a conical nozzle 104. The manifold 101 is fitted with a valve 105 which is controlled by means of a rod 106 which enters the tonneau.

To keep an even and constant pressure of oxygen at the intake port of metering valve 97, the reducing valves 100' and 101' are fitted to the oxygen manifold 101 and are after tests, permanently set to allow the oxygen manifold 101 to deliver the required number of atmospheres of oxygen to the metering valve per revolution for proper combustion within main engine cylinders. The reducer 100' or the first reducer, will be adjusted to deliver the varying pressure of oxygen from the flasks to the second reducer 101'; which in turn will be required to deliver the constant required pressure of oxygen to the metering valve to properly supply the main engines their combustive elements.

Upon functioning of the metering valve 97, the proper percentage of oxygen is measured into the mixing tank 95 as required by the engines.

Fans or blowers 107 are disposed in the mixing tank to cause diffusion of replenished oxygen with the nitrogen, CO₂ and CO. Suitable gauges are provided to ascertain the percentage of oxygen going to the main engines and to ascertain whether an explosive mixture is being accumulated due to the mixing of oxygen and CO₂.

The metering valve is made adjustable in any suitable manner for regulation to provide oxygen to support combustion, the amount of "O" being preferably under 20% and over 12%. About 16% oxygen will be used under normal conditions.

The bulkhead 32 is flanged to receive the engine intake pipe 108 which carries the combustible mixture from the mixing tank to the engine air induction valves. The suction within the pipe 108 is caused by the air intake strokes of the main engines. The air mixture in the pipe also passes through and cools the motor 53.

It will be observed from the above that high pressure oxygen replenishes that used by the engines, that some CO₂ and CO is removed, and that the CO₂ removed is sufficient to avoid explosion when the mixture is placed in contact with oxygen. The cooling and smoothing out of the exhaust will cause the heavier gas, CO₂, to separate from the lighter gas, nitrogen, allowing a percentage of CO₂ to be pumped into containers by the compressor 93. Certain purification exists in the control tank 15 due to the affinity of CO₂ for sea water, leaving some traces of CO₂ in the control tank, which control tank is not open to the sea. As it is not necessary to support life, but combustion only, traces of CO₂ will pass through combustion indefinitely without difficulty or chemical change.

*Auxiliary submerged propulsion*

Air is used as an auxiliary to oxygen, being stowed and compressed in the high pressure flasks by the air compressors while in the surface or awash condition and used in the same manner that the oxygen would be used, but with the reducers 100' and 101' set to deliver about five times the pressure or volume that would be required in using oxygen. The air compressor machinery would then be operated to a speed that would eliminate excessive internal pressure, and discharge into the high pressure flasks as they become void of air.

In using air as above, the radius of action submerged is reduced to about one fourth or one fifth of the radius of action obtained in the use of oxygen.

However, this auxiliary means of submerged propulsion eliminates necessity of replenishing oxygen when operating distantly from a source of supply, and can be continued until fuel is exhausted. A safety valve will be installed at the upper end of the exhaust or intake tubes to be used in connection with the auxiliary submerged propulsion in relieving excessive pressure. The torpedo is constructed to withstand about ten or fifteen pounds pressure internally and the mentioned safety valve will have a settling in conformity to this test pressure.

*Exploder arming mechanism*

The exploders 109 are arranged on the exploder bulkhead to align with the detonating primers 38, as shown in Fig. 6, and each contains a spring retracted weighted firing pin 110. The fulminate of mercury detonator 111 is applied to the end of a radial holding rod 112 which moves outwardly to place the detonator in the path of the firing pin through an opening 113 in the side of the detonator, which is equipped with an explosive passage 114 registering with the detonator and primer.

The holding rods 112 slide in suitable bearings 115 and the inner ends bear upon a spiral cam 116. The cam carries an integral shaft 117 which threads into a tube 118. A stub shaft 119 is splined, as shown at 120, within the shaft 117 and during rotation of the shaft 119 the cam 116 is rotated and simultaneously fed into the tube 118 whereupon the holding rods 112 ride out on the spiral surface of the cam to position the detonators in front of the firing pins, in which position of the parts the mechanism is armed to explode upon contact.

The shaft 119 is carried by a suitable spider 121, and the tube 118 is carried by a similar spider 122, both being secured to the bulkhead on opposite sides thereof.

The cam is driven from an arming shaft 123 and a connecting shaft 124 suitably geared together. The shaft 123 passes back through bulkhead 31 throughout the length of the hull and is driven from the main engines.

As shown in Fig. 3, the shaft, underneath the tonneau, is equipped with a clutch 125 and a shipper 126, which latter is actuated by a crank 127, a gear 128 and gear teeth 129 carried by the trip shaft 81. The clutch is normally off and when the trip shaft is actuated to release the tonneau, the clutch is automatically thrown to the on position to connect the shaft 123 with the motor and drive the cam 116.

When the cam has operated its full throw, a frangible pin 130, which secures the lower gear 131 on the connecting shaft 124, breaks and allows said gear to idle so that te cam is disconnected from the power.

*Full war conditions*

The torpedo, after being provisioned, would be balanced and lead ballasted and the control tank flooded to give positive buoyancy.

The trim tank compensating pumps, driven from the main engines, will be adjusted to discharge the trim tank ballast into the fresh water service and overboard as fuel is used by the main engines, being displaced by the heavier element, sea water. Trim tank compensating pumps will be adjusted to eject the ballast in conformity to the lever arm of the fuel tank in use. Lubricating oil compensation, being more negligible, will be handled locally.

*Operations*

Due to the limited crew carried, the functions of the weapon are intended to be as completely automatic as possible. The routine will be similar to that of the submarine service with the use of the upper bridge in fair weather, while navigation in foul weather is carried on entirely from the tonneau.

Communication between the body of the torpedo and the tonneau is complete and easy in the surface condition, while going into the submerged condition, the tonneau can be entirely isolated from the remainder of the weapon.

After obtaining final trim in the full war condition, this trim is kept constant until the fuel is exhausted.

Having thus described the invention, we claim:

1. In a strategical demolition torpedo, a hull, fuel tanks in the hull, a control tank in the hull adapted to be filled with sea water, oxygen flasks above said tanks, an internal combustion engine, means for conducting the exhaust gases from the engine through said control tank and into the space around said flasks whereby the gases are purified, cooled and smoothed out, a metering valve for delivering oxygen from the flasks, a mixing tank receiving said smoothed out exhaust gases and receiving oxygen from said metering valve, and a pipe conveying the mixture from said mixing tank to the intake of said engine.

2. In a strategical demolition torpedo, a hull, an internal combustion engine, oxygen flasks in the hull, a control tank for sea water on the bottom of the hull below said oxygen flasks, a mixing tank adjacent the oxygen flasks, means for conducting the hot exhaust gases from the engine forward through said control tank and into the space around said flasks for purification, cooling and smoothing out, means for conducting the lighter cooled exhaust gases aft into said mixing tank, means for withdrawing and segregating the cooled heavier exhaust gases, a metering valve for delivering oxygen from said flasks to said mixing tank, and means for conducting the combustible mixture from said mixing tank to the air intake valves of said engine.

3. In a strategical demolition torpedo, a hull, a control tank having the dual function of trimming the weapon and purifying and cooling the engine exhaust gases while the weapon is submerged, an internal combustion engine, means for conducting the exhaust gases from the engine through said control tank and from thence into the space above the tank, oxygen flasks in said space, baffles in said space, the cooled purified exhaust gases passing over said tanks and through said baffles and thereby being smoothed out, a mixing tank, means for conducting the smoothed out cooled exhaust gases into said mixing tank, a valve driven by said engine and operatively connected to said flasks and to said mixing tank for delivering a metered quantity of oxygen to said tank, fans in said tank causing diffusion of the replenished oxygen laden exhaust gases, and means for conducting the mixture from the mixing tank to the intake of said engine.

4. In a strategical demolition torpedo, a hull, an internal combustion engine, a fairwater carried by the hull, a cross connecting valve in the fairwater, tubes in the fairwater controlled by the valve and operatively connected to said engine and adapted to conduct the exhaust therefrom through said fairwater inboard into the hull when said valve is closed in submerged condition, a control tank in the hull adapted to be filled with sea water, a pipe connecting one of said tubes with said control tank for conducting the hot exhaust gases through the sea water therein for cooling and purification, oxygen flasks in the hull above said control tank, a pipe conducting said cooled purified exhaust gases forward beyond said oxygen flasks, means for withdrawing said gases aft around said flasks whereby to further cool and smooth out the gases, a mixing tank, a pipe conducting said smoothed out exhaust gases into said mixing tank, a power driven metering valve conducting oxygen from said flasks into said mixing tank, and means conducting the combustible mixture from said mixing tank to the intake of said engine.

5. In a strategical demolition torpedo, a hull, a fairwater on the hull, spaced tubes in said fairwater, a valve at the top of the fairwater adapted to be opened in fair weather to vent the tubes to the atmosphere and adapted to be closed during submerged condition to cross connect the tubes, an internal combustion engine, a pipe extending from one of said tubes to the exhaust valves of said engine, a control tank in the hull adapted to be filled with sea water, a pipe connecting the other of said tubes with said control tank and terminating in spray extensions adapted to discharge into said sea water, a pipe conducting gases from said control tank forwardly in the hull and discharging the same into the space in the hull above the control tank, oxygen flasks in said space, said gases passing aft along said oxygen flasks, a mixing tank, a pipe conducting said gases into said mixing tank, a power driven metering valve for delivering oxygen from said flasks into said mixing tank, and a pipe conducting the mixed gases from said mixing tank to the intake of said engine.

6. Submerged propulsion apparatus comprising a hull, a control tank therein adapted to be filled with sea-water for processing exhaust gases, an internal combustion engine having the exhaust operatively connected to said tank, an oxygen supply, a mixing chamber adapted to receive exhaust gases from the tank and oxygen from the oxygen supply, means operated by the engine to admit a predetermined percentage of oxygen to said chamber for mixing with the processed exhaust gases to form a combustible mixture, and means for conducting said mixture to the engine.

7. In a strategical demolition torpedo, a hull, fuel, lubricating oil, and ballast tanks extending along the bottom of the hull, one of the ballast tanks forming a control tank adapted to contain sea-water and having the dual function of trimming the weapon and purifying and cooling the engine exhaust gases while the weapon is submerged, an internal combustion engine operatively connected to the fuel and lubricating oil tanks and having the exhaust operatively connected to the control tank, oxygen flasks superposed in the hull above said tanks, a mixing chamber adapted to receive exhaust gases from the control tank and oxygen from the oxygen flasks to form a combustible mixture, and means for conducting said mixture to the engine.

8. In a strategical demolition torpedo, a hull, a deck disposed longitudinally within the hull, a control tank adapted to be filled with sea-water for processing exhaust gases located in the bottom of the hull below the deck, an internal combustion engine having the exhaust adapted to be connected to said tank, a plurality of oxygen flasks stored on the deck above the tank, bulkheads coacting with the deck and hull in forming a cooling and smoothing out chamber around said flasks for exhaust gases, means for conducting the engine exhaust to said tank, means for conducting the exhaust from said tank into said cooling and smoothing out chamber, means for supplying the cooled smoothed out exhaust gases with oxygen to form a combustible mixture, and means for conducting said mixture to the engine.

9. In a strategical demolition torpedo, a hull, a control tank adapted to contain sea-water disposed in the bottom of the hull, a storage compartment for oxygen flasks in the top of the hull forming a smoothing out and cooling chamber for exhaust gases, oxygen flasks in said compartment, a pipe for conducting exhaust gases from the engine into said tank, a pipe conducting said gases from said tank to the forward end of said compartment, a mixing chamber at the rear end of said compartment, a pipe opening near the top of the hull in said compartment and entering said mixing chamber for conducting the lighter cooled smoothed out gases from said compartment to said chamber, means for supplying the mixing chamber with oxygen to form a combustible mixture, and means for conducting said mixture to the engine.

10. Submerged propulsion apparatus comprising a hull, an internal combustion engine in the hull, a control tank in the bottom of the hull near the center thereof adapted to be filled with sea-water for trimming the hull when submerged and adapted to remove a percentage of $CO_2$ from the engine exhaust gases, means for discharging said exhaust gases into said tank, oxygen flasks above the tank, a chamber in the hull for the flasks, means for conducting the exhaust gases from the tank into said chamber for expanding, cooling and smoothing out the gases, means for supplying said smoothed out gases with a predetermined percentage of oxygen from the flasks to form a combustible mixture, and means for conducting the combustible mixture to the intake of the engine.

11. Submerged propulsion apparatus comprising a hull, spaced tubes rising therefrom, an internal combustion engine for propelling the hull having the exhaust connected to one of said tubes, a valve cross-connecting said tubes and adapted to be held closed by water pressure to cross-connect both tubes whereby the exhaust gases may be conducted back into the hull when the hull is submerged, a control tank in the hull below the center of gravity thereof adapted to be filled with sea-water to trim the hull when submerged and adapted to remove a percentage of $CO_2$ from the exhaust gases, means connecting said tubes to the tank to conduct the exhaust gases into the tank, oxygen flasks above the tank, a chamber for the flasks, means for conducting the exhaust gases from the tank into said chamber to be expanded, cooled and smoothed out, means for supplying said smoothed out gases with a predetermined percentage of oxygen from the flasks to form a combustible mixture, and means for conducting the combustible mixture to the intake of the engine.

JOSEPH BARRAJA-FRAUENFELDER.
WILLIAM C. MAGEE.
JOHN H. THOMAS. [L. S.]
PHILIP P. KRUG.